United States Patent
Pedersen et al.

(10) Patent No.: US 12,389,403 B2
(45) Date of Patent: Aug. 12, 2025

(54) METHOD AND APPARATUS FOR PERFORMING WIRELESS COMMUNICATIONS

(71) Applicant: NOKIA TECHNOLOGIES OY, Espoo (FI)

(72) Inventors: Klaus Pedersen, Aalborg (DK); István Zsolt Kovácks, Aalborg (DK); Zexian Li, Espoo (FI); Gilberto Berardinelli, Aalborg (DK); Renato Barbosa Abreu, Aalborg (DK); Thomas Jacobsen, Aalborg Øst (DK)

(73) Assignee: Nokia Technologies Oy, Espoo (FI)

( * ) Notice: Subject to any disclaimer, the term of this patent is extended or adjusted under 35 U.S.C. 154(b) by 40 days.

(21) Appl. No.: 15/733,421

(22) PCT Filed: Jan. 25, 2018

(86) PCT No.: PCT/FI2018/050061
§ 371 (c)(1),
(2) Date: Jul. 23, 2020

(87) PCT Pub. No.: WO2019/145595
PCT Pub. Date: Aug. 1, 2019

(65) Prior Publication Data
US 2021/0068097 A1     Mar. 4, 2021

(51) Int. Cl.
*H04W 72/21*   (2023.01)
*H04L 1/1812*  (2023.01)
*H04W 72/23*   (2023.01)

(52) U.S. Cl.
CPC .......... *H04W 72/21* (2023.01); *H04L 1/1812* (2013.01); *H04W 72/23* (2023.01)

(58) Field of Classification Search
CPC ......... H04W 72/0413; H04W 72/1284; H04W 72/14; H04W 72/21; H04W 72/23; H04L 1/1812
See application file for complete search history.

(56) References Cited

U.S. PATENT DOCUMENTS

| | | | |
|---|---|---|---|
| 10,791,569 B2 * | 9/2020 | Salem | H04W 16/14 |
| 2012/0026931 A1 | 2/2012 | Wentink | |
| 2017/0034845 A1 * | 2/2017 | Liu | H04W 72/1268 |

(Continued)

FOREIGN PATENT DOCUMENTS

| | | |
|---|---|---|
| CN | 105284172 A | 1/2016 |
| CN | 107615693 A | 1/2018 |

(Continued)

OTHER PUBLICATIONS

International Search Report and Written Opinion for International Application No. PCT/FI2018/050061, mailed on May 25, 2018, 15 pages.

(Continued)

*Primary Examiner* — Jasper Kwoh
(74) *Attorney, Agent, or Firm* — Brake Hughes Bellermann LLP

(57) ABSTRACT

A grant free uplink data transmission is caused from a device using one of a plurality of subsets of a set of physical resource blocks. Each subset is associated with a transmission scheme, wherein at least a plurality of said subsets are associated with different transmission schemes.

22 Claims, 8 Drawing Sheets

(56) References Cited

U.S. PATENT DOCUMENTS

| | | | |
|---|---|---|---|
| 2017/0171855 A1 | 6/2017 | Sundararajan et al. | |
| 2017/0348345 A1 | 12/2017 | Samaranayake et al. | |
| 2017/0367110 A1 | 12/2017 | Li et al. | |
| 2018/0092125 A1* | 3/2018 | Sun | H04W 74/02 |
| 2018/0270799 A1* | 9/2018 | Noh | H04L 5/0094 |
| 2021/0195557 A1* | 6/2021 | Wong | H04W 72/0413 |
| 2021/0235477 A1* | 7/2021 | Baldemair | H04L 5/0048 |
| 2021/0368494 A1* | 11/2021 | Chen | H04L 1/0003 |

FOREIGN PATENT DOCUMENTS

| | | | |
|---|---|---|---|
| WO | 2017039564 | A1 | 3/2017 |
| WO | 2018010786 | A1 | 1/2018 |

OTHER PUBLICATIONS

3GPP TR 38.802, V14.2.0; "3rd Generation Partnership Project; Technical Specification Group Radio Access Network; Study on New Radio Access Technology Physical Layer Aspects (Release 14)"; Sep. 2017, Sophia Antipolis, Valbonne, France; 144 pages.
3GPP TSG-RAN WG1 #91, R1-1720534; "URLLC Design for LTE"; Nov. 27-Dec. 1, 2017; Reno, Nevada, USA; 7 pages.
Tian et al., "On Uplink Non-Orthogonal Multiple Access for 5G: Opportunities and Challenges", Emerging Technologies & Applications; China Communications; vol. 14, No. 12; Dec. 2017; pp. 142-152.
First Examiner Report for Indian Application No. 202047035956, dated Nov. 24, 2021, 6 pages.
European Search Report for Application No. 18902963.0, mailed Jun. 30, 2021, 12 pages.
3gpp TSG-RAN WG1 NR Ad-Hoc#2, R1-1711006; "Issues and Control Design for UL Grant-Free URLLC", Agenda Item: 5.1.3.3.3; Source: Institute for Information Industry (III); Qingdao, P.R. China; Jun. 27-30, 2017; 5 pages.
GPP TSG RAN WG1 NR Ad-Hoc #3, R1-1715420; "On Multiple Resource Configuration for UL Grant-Free Transmission", 3, Agenda Item: 6.3.3.7; Source: Huawei, HiSilicon; Nagoya, Japan; Sep. 18-21, 2017; 6 pages.
Office Action for Chinese Application No. 201880090564.5, mailed on Feb. 22, 2023, 11 pages.
Communciation under Rule 71(3) EPC for European Application No. 18902963.0, mailed on Jul. 24, 2023, 40 pages.
Office Action for Chinese Application No. 201880090564.5, mailed on Aug. 26, 2023, 13 pages.
Rejection Decision for Chinese Patent Application No. 201880090564.5, mailed on Nov. 30, 2023, 12 pages.

* cited by examiner

METHOD AND APPARATUS FOR PERFORMING WIRELESS COMMUNICATIONS

CROSS-REFERENCE TO RELATED APPLICATIONS

This application is a national stage entry of International Application No. PCT/FI2018/050061, filed Jan. 25, 2018, entitled "METHOD AND APPARATUS FOR PERFORMING WIRELESS COMMUNICATIONS" which is hereby incorporated by reference in its entirety.

TECHNICAL FIELD

This disclosure relates to communications, and more particularly to a method and apparatus in a wireless communication system. In particular, but not exclusively, some embodiments relate to grant free transmission.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices. The communication may comprise, for example, communication of data for carrying data for voice, electronic mail (email), text message, multimedia and/or content data communications and so on. Non-limiting examples of services provided include two-way or multi-way calls, data communication or multimedia services and access to a data network system, such as the Internet.

In a wireless system at least a part of communications occurs over wireless interfaces. Examples of wireless systems include public land mobile networks (PLMN), satellite based communication systems and different wireless local networks, for example wireless local area networks (WLAN). A local area wireless networking technology allowing devices to connect to a data network is known by the tradename WiFi (or Wi-Fi). WiFi is often used synonymously with WLAN. The wireless systems can be divided into cells, and are therefore often referred to as cellular systems. A base station provides at least one cell.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved. Communication protocols and/or parameters which shall be used for the connection are also typically defined. Non-limiting examples of standardised radio access technologies include GSM (Global System for Mobile), EDGE (Enhanced Data for GSM Evolution) Radio Access Networks (GERAN), Universal Terrestrial Radio Access Networks (UTRAN), evolved UTRAN (E-UTRAN) and 5G New Radio (NR). An example communication system architecture is the long-term evolution (LTE) of the Universal Mobile Telecommunications System (UMTS) radio-access technology. The LTE is standardized by the third Generation Partnership Project (3GPP). The LTE employs the Evolved Universal Terrestrial Radio Access Network (E-UTRAN) access and a further development thereof which is sometimes referred to as LTE Advanced (LTE-A). Since the introduction of fourth generation (4G) services increasing interest has been paid to the next, or so-called fifth generation (5G) standard. 5G may also be referred to as a New Radio (NR) network.

SUMMARY

According to a first aspect, there is provided method comprising: causing a grant free uplink data transmission from a device using one of a plurality of subsets of a set of physical resource blocks, each subset being associated with a transmission scheme, at least a plurality of said subsets being associated with different transmission schemes.

The different ones of said subsets may be associated with different numbers of physical resource blocks.

The set of physical resource blocks may comprise N physical resource blocks divided into a plurality of sub band levels.

The number of sub bands in a level may be $2^x$ where X is a level number and a first level is level 0.

The number of physical resource blocks of a sub band of a level may be $N/2^x$.

The transmission schemes may be dependent on the level.

The transmission schemes may each comprise at least one of: a modulation and coding scheme and a transmit power level.

The method may comprise receiving information providing an initial configuration for said subsets of said set of physical resource blocks.

One of said subsets may be a default subset, said default subset being initially used in said grant free uplink transmission.

The default subset may have the largest bandwidth of said subsets.

The method may comprise receiving from an access point information defining which of said subsets is to be used for said grant free uplink transmission.

The method may comprise determining in said device which of said subsets is to be used and using said subset for said grant free uplink transmission.

The method may comprise determining in said device which of said subsets is to be used and causing information about the determined subset to be provided to the access point.

The transmission may comprise a hybrid automatic repeat request retransmission.

According to a second aspect, there is provided method comprising: causing information to be provided to a device, said information indicating which of a plurality of subsets of a set of physical resource blocks is to be used by said device for grant free uplink transmissions, each subset being associated with a transmission scheme, at least a plurality of said subsets being associated with different transmission schemes.

The different ones of said subsets may be associated with different numbers of physical resource blocks.

The set of physical resource blocks may comprise N physical resource blocks divided into a plurality of sub band levels.

The number of sub bands in a level may be $2^x$ where X is a level number and a first level is level 0.

The method may comprise transmitting information to the device providing an initial configuration for said subsets of said set of physical resource blocks for grant free uplink transmission.

One of said subsets may be a default subset, said default subset being initially used in said grant free uplink transmission.

The default subset may have a largest bandwidth of said subsets.

The method may comprise determining that a different subset is to be used by the device for grant free uplink transmissions.

The method may comprise receiving information from the device about which of said subsets said device proposes to use for grant free uplink transmission.

The method may comprise using the received information from the device to determine which of said subsets should be used by said device for grant free uplink transmissions.

The transmission schemes may each comprise at least one of: a modulation and coding scheme and a transmit power level.

According to a third aspect, there is provided apparatus comprising at least one processor and at least one memory including computer program code, the at least one memory and the computer program code configured, with the at least one processor, to cause the apparatus at least to: cause a grant free uplink data transmission using one of a plurality of subsets of a set of physical resource blocks, each subset being associated with a transmission scheme, at least a plurality of said subsets being associated with different transmission schemes.

The apparatus may be provided in a user equipment.

The different ones of said subsets may be associated with different numbers of physical resource blocks.

The set of physical resource blocks may comprise N physical resource blocks divided into a plurality of sub band levels.

The number of sub bands in a level may be $2^x$ where X is a level number and a first level is level 0.

The number of physical resource blocks of a sub band of a level may be $N/2^x$.

The transmission scheme may be dependent on the level.

The transmission schemes may each comprise at least one of: a modulation and coding scheme and a transmit power level.

The at least one memory and the computer program code may be configured, with the at least one processor, to cause the apparatus to receive information providing an initial configuration for said subsets of said set of physical resource blocks.

One of said subsets may be a default subset, said default subset being initially used in said grant free uplink transmission.

The default subset may have a largest bandwidth of said subsets.

The at least one memory and the computer program code may be configured, with the at least one processor, to cause the apparatus to receive from an access point information defining which of said subsets is to be used for said grant free uplink transmission.

The at least one memory and the computer program code may be configured, with the at least one processor, to cause the apparatus to determine in said device which of said subsets is to be used and using said subset for said grant free uplink transmission.

The at least one memory and the computer program code may be configured, with the at least one processor, to cause the apparatus to determine in said device which of said subsets is to be used and causing information about the determined subset to be provided to the access point.

The transmission may comprise a hybrid automatic repeat request retransmission.

According to a fourth aspect, there is provided apparatus comprising at least one processor and at least one memory including computer program code, the at least one memory and the computer program code configured, with the at least one processor, to cause the apparatus at least to: cause information to be provided to a device, said information indicating which of a plurality of subsets of a set of physical resource blocks is to be used by said device for grant free uplink transmissions, each subset being associated with a transmission scheme, at least a plurality of said subsets being associated with different transmission schemes.

The apparatus may be provided in an access point.

The different ones of said subsets may be associated with different numbers of physical resource blocks.

The set of physical resource blocks may comprise N physical resource blocks divided into a plurality of sub band levels.

The number of sub bands in a level may be $2^x$ where X is a level number and a first level is level 0.

The at least one memory and the computer program code may be configured, with the at least one processor, to cause the apparatus to cause information to be transmitted to the device providing an initial configuration for said subsets of said set of physical resource blocks for grant free uplink transmission.

One of said subsets may be a default subset, said default subset being initially used in said grant free uplink transmission.

The default subset may have a largest bandwidth of said subsets.

The at least one memory and the computer program code may be configured, with the at least one processor, to cause the apparatus to determine that a different subset is to be used by said device for grant free uplink transmissions.

The at least one memory and the computer program code may be configured, with the at least one processor, to cause the apparatus to receive information from the device about which of said subsets said device proposes to use for grant free uplink transmission.

The at least one memory and the computer program code may be configured, with the at least one processor, to cause the apparatus to use the received information from the device to determine which of said subsets should be used by said user equipment for grant free uplink transmissions.

The transmission schemes may each comprise at least one of: a modulation and coding scheme and a transmit power level.

According to a fifth aspect, there is provided an apparatus comprising: means for causing a grant free uplink data transmission using one of a plurality of subsets of a set of physical resource blocks, each subset being associated with a transmission scheme, at least a plurality of said subsets being associated with different transmission schemes.

The apparatus may be provided in a user equipment.

The different ones of said subsets may be associated with different numbers of physical resource blocks.

The set of physical resource blocks may comprise N physical resource blocks divided into a plurality of sub band levels.

The number of sub bands in a level may be $2^x$ where X is a level number and a first level is level 0.

The number of physical resource blocks of a sub band of a level may be $N/2^x$.

The transmission scheme may be dependent on the level.

The transmission schemes may each comprise at least one of: a modulation and coding scheme and a transmit power level.

The apparatus may comprise means for receiving information providing an initial configuration for said subsets of said set of physical resource blocks.

One of said subsets may be a default subset, said default subset being initially used in said grant free uplink transmission.

The default subset may have a largest bandwidth of said subsets.

The apparatus may comprise means for receiving from an access point information defining which of said subsets is to be used for said grant free uplink transmission.

The apparatus may comprise means for determining which of said subsets is to be used and using said subset for said grant free uplink transmission.

The apparatus may comprise means for determining which of said subsets is to be used and causing information about the determined subset to be provided to the access point.

The transmission may comprise a hybrid automatic repeat request retransmission.

According to a sixth aspect, there is provided an apparatus comprising: means for causing information to be provided to a device, said information indicating which of a plurality of subsets of a set of physical resource blocks is to be used by said device for grant free uplink transmissions, each subset being associated with a transmission scheme, at least a plurality of said subsets being associated with different transmission schemes.

The apparatus may be provided in an access point.

The different ones of said subsets may be associated with different numbers of physical resource blocks.

The set of physical resource blocks may comprise N physical resource blocks divided into a plurality of sub band levels.

The number of sub bands in a level may be $2^x$ where X is a level number and a first level is level 0.

The apparatus may comprise means for causing transmitting of information to the device providing an initial configuration for said subsets of said set of physical resource blocks for grant free uplink transmission.

One of said subsets may be a default subset, said default subset being initially used in said grant free uplink transmission.

The default subset may have a largest bandwidth of said subsets.

The apparatus may comprise means for determining that a different subset is to be used by said device for grant free uplink transmissions.

The apparatus may comprise means for receiving information from the device about which of said subsets said device proposes to use for grant free uplink transmission.

The apparatus may comprise means for using the received information from the device to determine which of said subsets should be used by said user equipment for grant free uplink transmissions.

The transmission schemes may each comprise at least one of: a modulation and coding scheme and a transmit power level.

According to a seventh aspect, there is provided a computer program, comprising computer executable code which when run on at least one processor is configured to cause information to be provided to a device, said information indicating which of a plurality of subsets of a set of physical resource blocks is to be used by said device for grant free uplink transmissions, each subset being associated with a transmission scheme, at least a plurality of said subsets being associated with different transmission schemes.

According to an eighth aspect disclosed herein, there is provided a computer program, comprising computer executable code which when run on at least one processor is configured to cause a grant free uplink data transmission from a device using one of a plurality of subsets of a set of physical resource blocks, each subset being associated with a transmission scheme, at least a plurality of said subsets being associated with different transmission schemes.

Various other aspects and further embodiments are also described in the following detailed description and in the attached claims.

BRIEF DESCRIPTION OF THE DRAWINGS

To assist understanding of the present disclosure and to show how some embodiments may be put into effect, reference is made by way of example only to the accompanying drawings in which.

DETAILED DESCRIPTION

Figure 6:
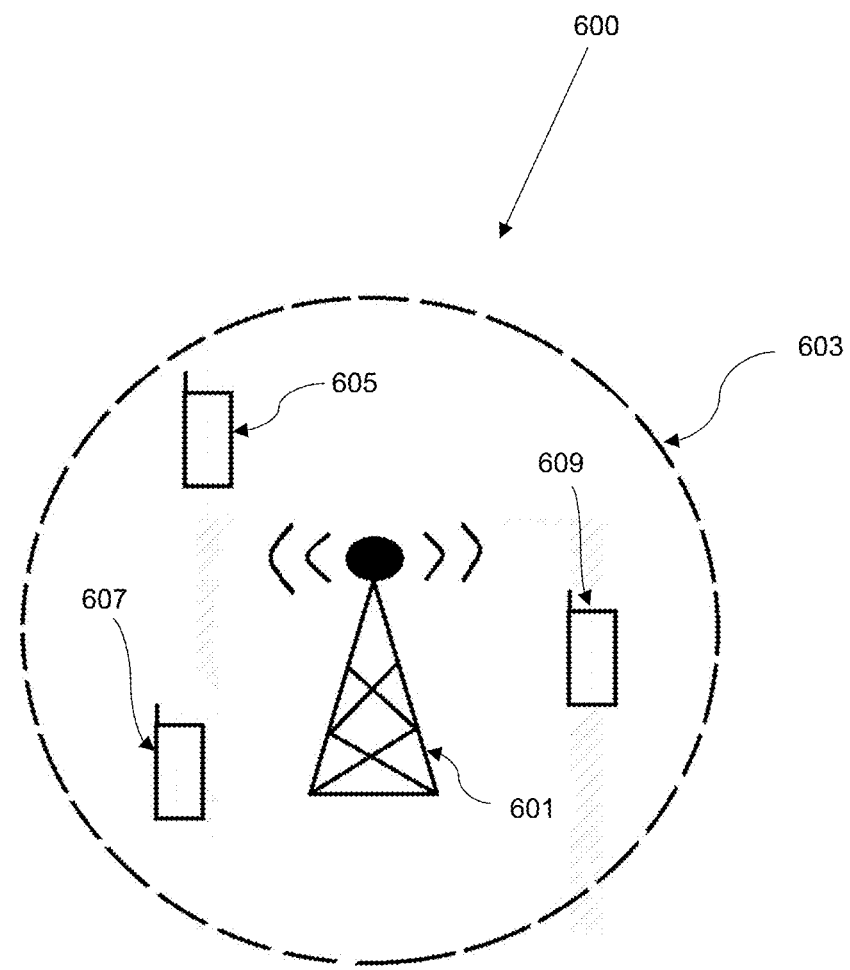
FIG. 6 shows schematically an example of communications network.

FIG. 6 shows schematically a system 600 of a network and UEs. The network comprises a base station implemented as a gNB 601, whose coverage area defines a cell 603. In other examples, the base station may be implemented as an eNB. The network supports a first UE 605, a second UE 607 and a third UE 609, all of which are within network coverage. In the presently illustrated example, all of the UEs 605, 607, 609 are within coverage of the gNB 601, but each of the UEs 605, 607, 609 are mobile and can therefore move in and out of coverage of the gNB 601. Other UEs not shown in FIG. 6 may also move into coverage of the gNB 601.

As will be discussed in more detail, some embodiments may provide mechanisms to allow the gNB 601 to communicate a configuration for the UEs 605, 607, 609 within coverage, in the form of a resource grid, to allow the UEs 605, 607, 609 to perform grant-free uplink transmission to the gNB 601. The gNB 601 and UEs 605, 607, 609 may be communicating, for example, to transmit configurations, transmit quality measurements and transmit data packets.

Figure 7:
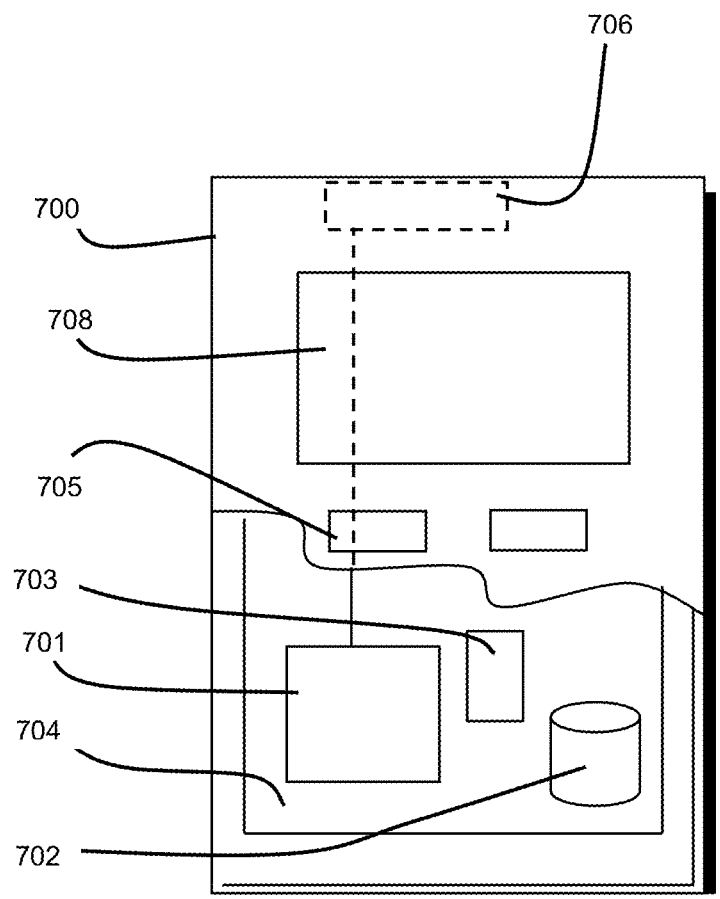
FIG. 7 shows schematically an example of mobile communications device.

An apparatus, for example a mobile communication device, will now be described in more detail with reference to FIG. 7 showing a schematic, partially sectioned view of a communication device 700. Such a communication device may be for example a mobile device (e.g. user equipment (UE)), that is, a device not fixed to a particular location, or it may be a stationary device. The wireless device may need human interaction for communication, or may not need human interaction for communication. The latter devices are sometimes referred to as MTC (machine type communication) devices (e.g. a sensor). Such devices may only have a subset of the components and/or simplified versions of the components shown in FIG. 7. In the present teachings the terms UE are used to refer to any type of wireless communication device. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 700 may receive signals over an air or radio interface via appropriate apparatus for receiving and may transmit signals via appropriate apparatus for transmitting radio signals. In FIG. 7 transceiver apparatus is designated schematically by block 706. The transceiver apparatus 706 may be provided for example by means of a radio part and associated antenna arrangement. The antenna arrangement may be arranged internally or externally to the mobile device.

A mobile device is typically provided with at least one data processing entity 701, at least one memory 702 and other possible components 703 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 704. The user may control the operation of the mobile device by means of a suitable user interface such as key pad 705, voice commands, touch sensitive screen or pad, combinations thereof or the like. A display 708, a speaker and a microphone can be also provided. Furthermore, a mobile communication device may comprise appropriate connectors (either wired or wireless) to other devices and/or for connecting external accessories, for example hands-free equipment, thereto. The communication devices 702, 704, 705 may access the communication system based on various access techniques.

Figure 8:
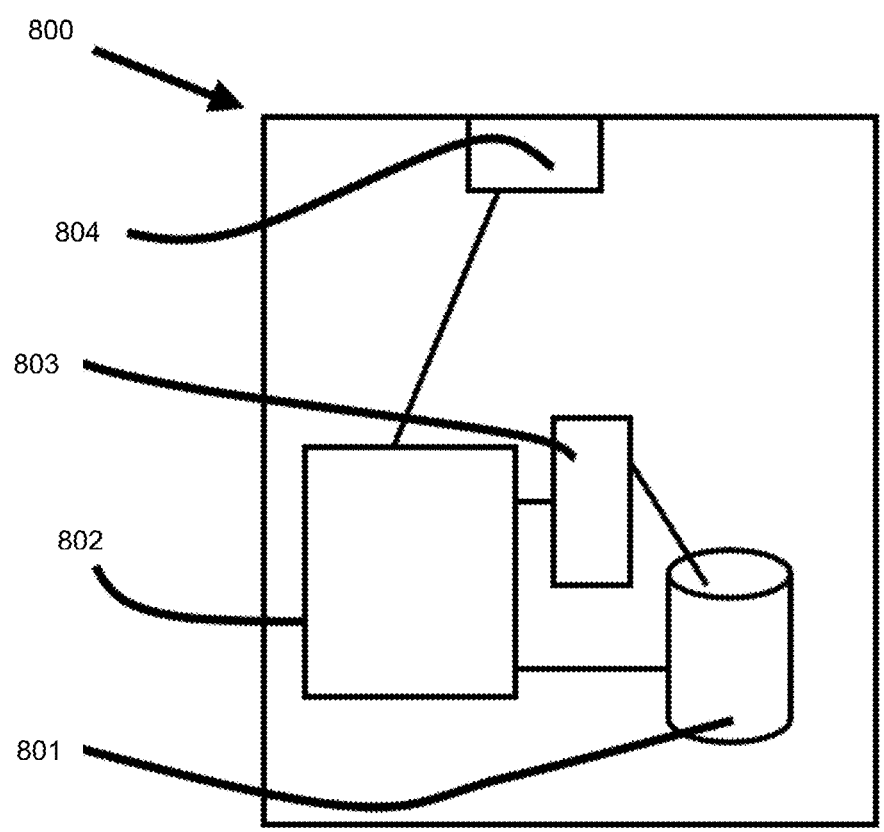
FIG. 8 shows schematically an example of a control apparatus.

An example apparatus is shown in FIG. 8. The apparatus 800 comprises at least one memory 801, at least one data processing unit 802, 803 and an input/output interface 804. The apparatus 800 or processor 802/803 can be configured to execute an appropriate software code to provide the control functions.

The processors 802, 803 may perform functions associated with the operation of apparatus 800.

In certain examples, the at least one memory 801 stores software modules that provide functionality when executed by the processors 802, 803. The modules may include an operating system that provides operating system functionality for apparatus 800. The components of apparatus 800 may be implemented in hardware, or as any suitable combination of hardware and software.

The apparatus 800 may be provided in an access point. In an example, the access point may be a base station.

According to some example embodiments, one or more of the blocks or functions illustrated in FIG. 6 or FIG. 7 may be embodied as a chip or chip set.

As will now be explained in more detail, some embodiments relate to 5G (NR) systems. However it should be appreciated that some embodiments may be used with any other suitable communication standard. Some embodiments also may be applicable for future LTE releases or other communication standards.

Some embodiments may be used with uplink (UL) grant-free transmissions for 5G Ultra-Reliable Low Latency Communications (URLLC). With UL grant free transmission, a number of user equipments can transmit their packets on time-frequency radio resources with the risk of collisions. Grant-free transmission may achieve lower latency and a lower signalling overhead than grant-based transmission since the user equipment (UE) does not need to send a scheduling request and wait for UL grant before the data transmission. It has been agreed to use grant free transmission for URLLC type of services.

Some embodiments may provide an enhancement for grant-free uplink transmissions over shared resources. Some embodiments may provide link adaptation and/or frequency resource allocation for grant-free uplink transmission.

Ultra-Reliable Low Latency Communications may require UEs to transmit data packets using a relatively robust modulation and coding scheme. This may require a large amount of resource blocks, and hence may use a large amount of radio resources. This may result in a less efficient resource utilization. Link adaptation may improve resource utilization by allowing UEs with power headroom to transmit at a higher modulation and coding scheme with a reduced bandwidth. This may reduce the probability of collisions.

If the UEs can autonomously decide which modulation and coding scheme (MCS) configuration to use, then it may result in a relatively high number of different MCS configurations. This may mean that a base station (BS) receiving transmission from the UEs would have to perform blind detection of all the possible MCSs including all the possible time/frequency allocations of the payload. This may lead to high complexity at the receiver side.

It has been proposed that there is an UL transmission scheme without grant supported for URLLC. Resource may or may not be shared among one or more users.

The different types of data transmission without grant may be configured by Radio Resource Control (RRC) and possibly through layer 1 (L1) signalling.

The following types of UL data transmission without grant have been proposed:

Type 1: UL data transmission without grant is only based on RRC (re)configuration without any L1 signalling;

Type 2: UL data transmission without grant is based on both RRC configuration and L1 signalling to activate/deactivate for UL data transmission without grant. Modification may be achieved by the L1 signalling by activation; and Type 3: UL data transmission without grant is based on RRC configuration, and allows L1 signalling to modify some parameters configured by RRC but no L1 signalling for activation.

Configurations may comprise one or more of:

periodicity and offset of a resource; time domain resource allocation; frequency domain resource allocation; UE-specific demodulation reference signal (DMRS) configuration; an MCS/transport block size (TBS) value; number of repetitions K; preamble sequences, and power control related parameters.

It has been proposed that multiple resource configurations for UL transmissions without UL grant may be configured to a UE. For UL transmission without UL grant, the same resource configuration may be used for K repetitions for a transport block including the initial transmission.

Some embodiments may provide uplink grant-free transmission, with link adaptation and frequency resource allocation for such cases.

Figure 1:
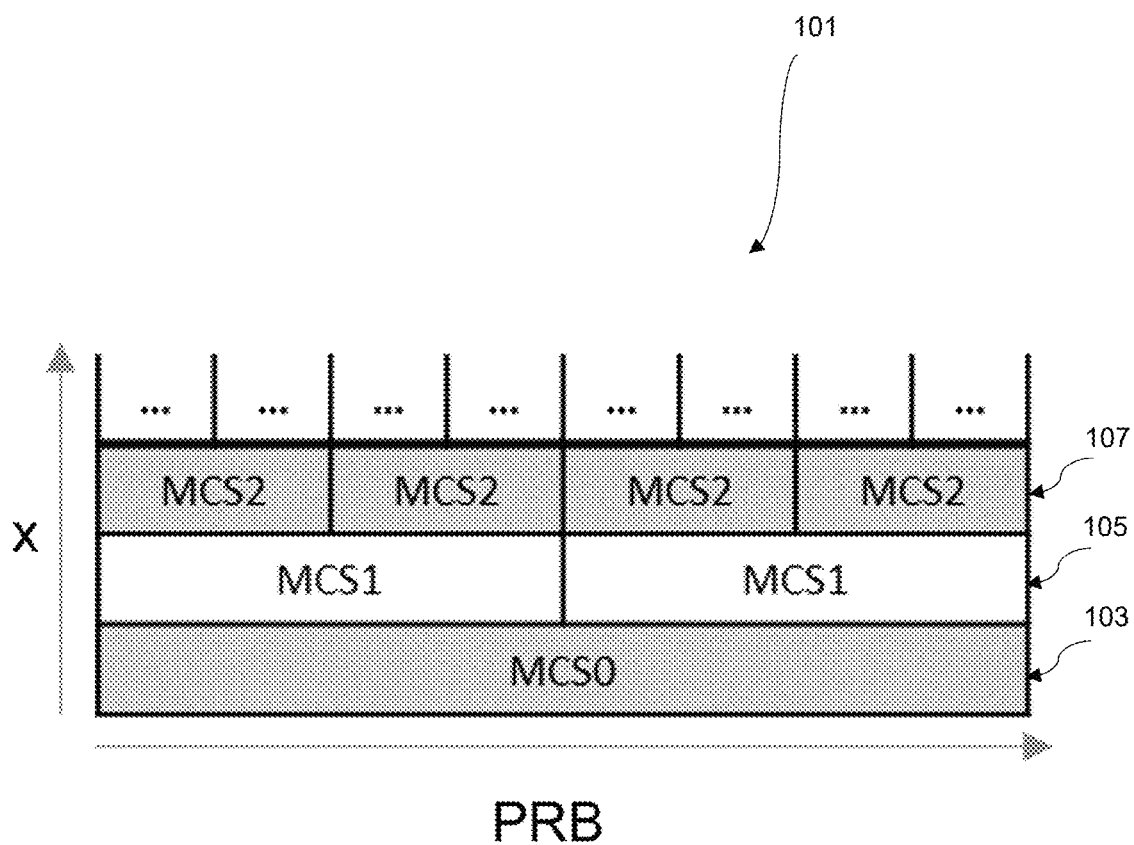
FIG. 1 shows schematically an example of a first resource.

Reference is now made to the drawings, FIG. 1 shows an example of a first resource grid 101 of sub-band levels 103, 105, 107 and associated modulation and coding schemes. A user equipment (UE), for example, may be configured with the first resource grid 101 in order to perform grant-free transmissions.

FIG. 1 shows a first sub-band 103 with a width of N physical resource blocks (PRB). This may be the maximum transmission bandwidth (N PRB) that the UE can use to perform grant-free transmissions. N may be any suitable number (e.g. 32 or 48). In principle, N can be an arbitrary positive integer from 1 to $N_{max}$, where $N_{max}$ is the number of PRBs for the carrier bandwidth. If the resource grid structure was being utilized as shown in FIG. 1, N may equal to a power of 2 (i.e. 2, 4, 8, 16 . . . ). In other examples, N may not be a power of 2. The first sub-band 103 level has a first MCS labelled MCS0. A second sub-band 105 level is shown whereby the physical resource blocks have been divided by 2. The second sub-band 105 has a second MCS labelled MCS1. A UE performing grant-free transmissions using the second sub-band 105 would transmit on half of the maximum transmission bandwidth. A third sub-band 107 level is shown whereby the physical resource blocks have been divided by 4. The third sub-band 107 has a third MCS labelled MCS2. A UE performing grant-free transmissions using the third sub-band 107 would transmit on a quarter of the maximum transmission bandwidth. The first, second and third MCSs may be different. In other examples, MCS0, MCS1 and MCS2 may be the same MCS but each have different power control settings.

In the example of FIG. 1 there are three different sub-band levels 103, 105, 107. In other examples, there may be a different number of sub-band levels.

For example, if a UE was configured with the first resource grid 101 and was to perform grant-free transmissions using the second sub-band 105 then the UE would use the second modulation and coding scheme MCS1 and would transmit on only half of the maximum transmission bandwidth.

Figure 2:
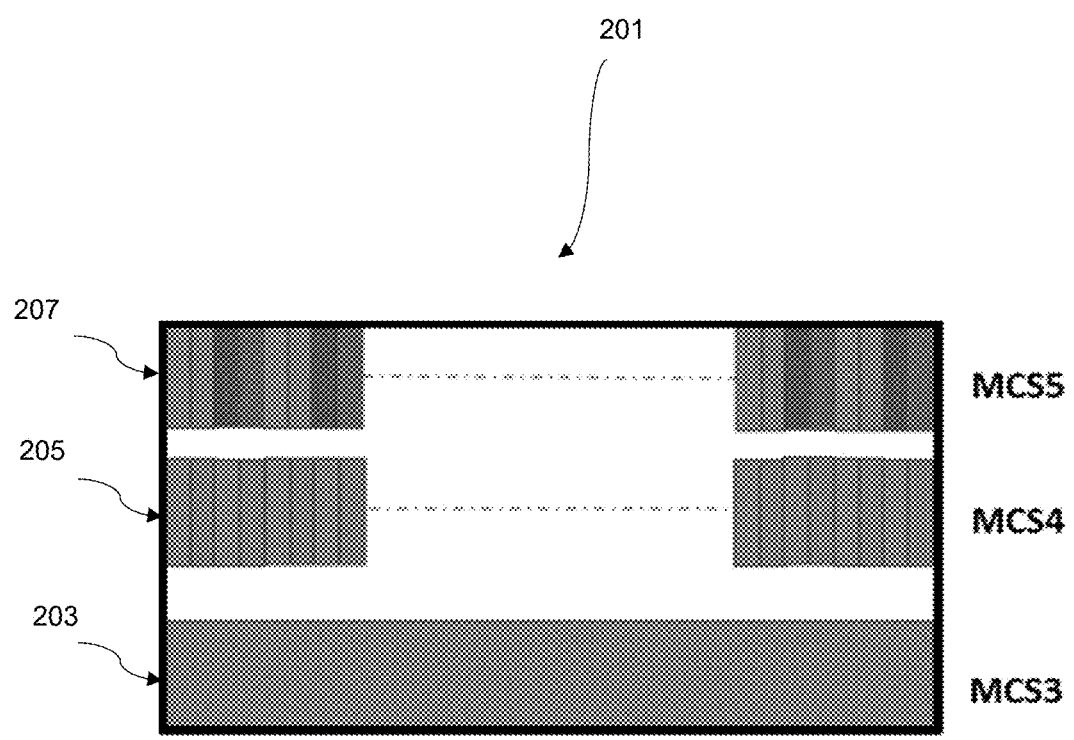
FIG. 2 shows schematically an example of a second resource grid.

FIG. 2 shows another example of a resource grid 201 of modulation and coding schemes. In this example, a UE configured with the second resource grid 201 would always transmit over the full transmission bandwidth. This may achieve a better frequency diversity for grant-free transmission. A UE performing grant-free transmissions using this configuration would transmit over all PRBs or with a subset of PRBs dependent on which MCS was being utilized.

FIG. 2 shows the second resource grid 201 with a third MCS 203, a fourth MCS 205 and a fifth MCS 207. In other examples there may be a different number of MCSs. The third MCS 203, fourth MCS 205 and fifth MCS 207 may be the same modulation schemes as MCS0, MCS1 and MCS2 respectively. In other examples, the modulation and coding schemes may be different.

The third MCS 203 has a width of N physical resource blocks (PRB). This may be the maximum transmission bandwidth (N PRB) for transmission. A UE utilizing the third MCS 203 would transmit over all of the PRBs. A UE utilizing the fourth MCS 205 would transmit on every other PRB. A UE utilizing the fifth MCS 207 would transmit on every fourth PRB.

Aspects of the resource grids 101, 201 of FIGS. 1 and 2 may be used in combination.

In some embodiments, the base station configures the resource grid. The UE may initially transmit in a default initial sub-band or in a signalled sub-band. The sub-band may be signalled to the UE by, for example, the base station. The sub-band may be a group of PRBs. In one embodiment, the base station may configure the UEs with an initial sub-band to be used, based for instance on knowledge of channel conditions or collision probability. In another embodiment, the UEs can start using a default initial configuration (e.g. larger sub-band).

When or if the base station detects a more favourable option, the base station signals the UE to perform the transmissions in a different sub-band/MCS from the configured resource grid.

Alternatively or additionally, the UE proposes the preferred MCS and sub-band size. This may for example be based on DL channel quality (for example in the case of time duplex division) and/or the application quality of service (QoS) parameters. This gives more autonomy to the UE, which can be beneficial in cases where the UE has capabilities, for example, to sense the channel quality and take faster decision. In some embodiments, the UE will then use that preferred MCS and sub-band size. In other embodiments, it may be up to base station to make the final decision as the base station may have more information such as number of UEs sharing the same sub-band, history collision rate etc.

Figure 3:
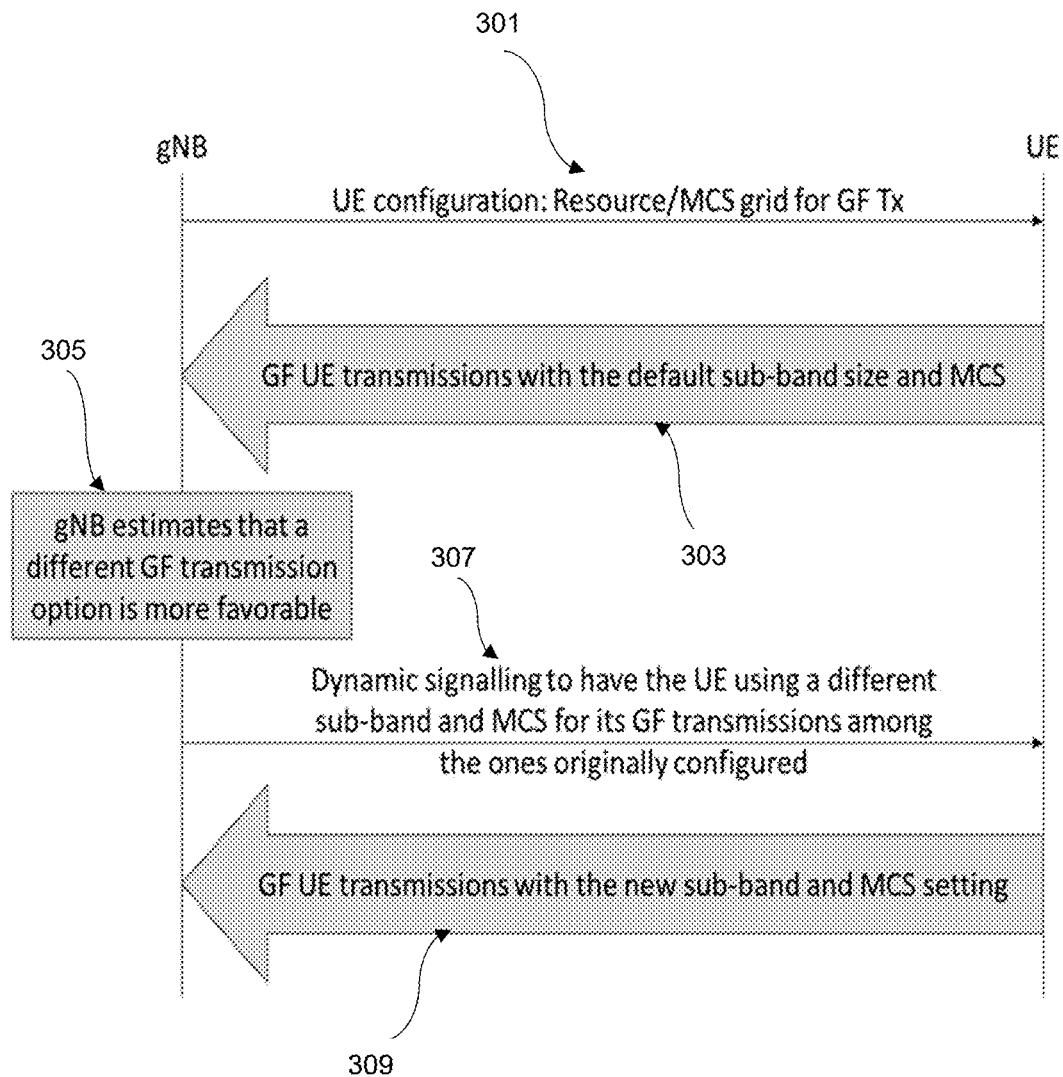
FIG. 3 shows schematically an example of a signalling between a base station and a user equipment.

FIG. 3 shows an example of signalling between a base station and a UE for grant-free transmissions. The base station may be, for example, a gNB, eNB etc.

At Step 301 the base station configures the UE with a resource grid for grant-free transmission. The UE may be configured with the resource grids 101, 201 shown in example FIG. 1 or 2.

The base station configures a certain set of time-frequency resources for uplink (UL) grant-free transmission to a set of connected UEs. This includes a maximum transmission bandwidth of N PRBs.

As one example, the N PRBs are divided into multiple sub-bands of $N/2^x$, where X is, for example, X=0, 1, 2, 3, ..., M.

For UE grant-free transmissions on the $x^{th}$ sub-band level, the UE shall use MCS scheme $MCS_X$. The resource grid (i.e. the sub-band transmission options) and MCS scheme may follow one of the resource grids 101, 201 as shown in FIGS. 1 and 2. Thus, for example, if the UE is configured with the first resource grid 101 and the UE sends a grant-free uplink transmission on the full bandwidth of N PRBs, then it uses MCS scheme $MCS_0$. If the UE transmits on one of the two sub-bands with N/2 PRBs, the UE uses $MCS_1$, and so forth.

The base station configures the N PRBs, sub-band options (i.e. valid values of x), and the corresponding MCS schemes. This may be, for example, configured via higher layer unicast or multicast or even broadcast signalling.

By way of example only, this may include a configuration with N=32 PRBs as a maximum transmission bandwidth, with x=0, 1, 2 (i.e. allowing transmission with either 32 PRBs when x=0, 16 PRBs when x=1, or 8 PRBs when x=2).

Alternatively or additionally, the base station may configure the UEs to operate different transmit power control settings, depending on the sub-band level (i.e. value of x) it uses. For a fractional path loss compensation open loop power control mechanism, this may imply using different values of $P_0$ and Alpha depending on the sub-band index x. Alpha is a compensation factor and $P_0$ is a target received power at the base station.

At step 303, the UE performs grant-free uplink transmission of data to the base station using the default sub-band and default MCS. By default, a UE configured with grant-free uplink transmission may transmit, for example, over the full bandwidth of N-PRBs with $MCS_0$ (e.g. 48 PRBs with x=0) whenever the UE has data to deliver to the base station. In other examples the UE may transmit on a random sub-band level with associated MCS.

At step 305, the base station estimates that a different grant-free transmission option is more favourable.

The estimation made by the base station may be based on, for example, measurements of signal strength, history collision rate, amount of UE's on same sub-band, CQI, etc. Alternatively or additionally, in another embodiment, the UE proposes the preferred MCS and/or sub-band level to the base station based on downlink channel quality and/or the application QoS measurements. However, the base station may make the final decision and to signal to the UE to change to a different sub-band and associated MCS.

In an alternative embodiment, the UE may determine a MCS and/or sub-band level to use and begin to perform grant free uplink transmissions using that determined MCS and/or sub-band level. The UE may then inform the base station which MCS and/or sub-band level the UE is using for the transmissions.

At step 307, the base station dynamically configures a respective UE to transmit at a different sub-band level. This may be configured by dedicated downlink signalling.

For example, the base station may signals, to the UE, with information for the UE to use a different sub-band and MCS for its grant-free transmissions when communicating with the base station.

This different sub-band and MCS may be the more favourable option that was estimated by the base station in step 305. There may be multiple different UE's connected to a single base station and the base station may dynamically configure each individual UE to transmit at different sub-band levels. The base station may signal the sub-band and MCS information via dedicated downlink signalling.

As an example, the dedicated DL signalling may be facilitated via dedicated RRC signalling, MAC control element (MAC-CE) signalling, or faster physical layer (PHY-layer) signalling such as Physical Downlink Control Channel (PDCCH). The signalling to the UE or UEs may be event-based signalling where the base station decides when or if the base station is to signal a new sub-band allocation (and therefore also MCS scheme) to certain UEs.

The information signalled to the UE at step 307 may comprise information regarding which of the sub-bands, that the UE was configured with at step 301, should the UE use for future grant-free transmissions. Alternatively or additionally, the information may include the value of x (i.e. amount of sub-bands). Then the UE may randomly select, for example with equal probability, which of the x+1 sub-bandwidth options is used for each new grant-free transmission.

By dynamically adjusting the transmission bandwidth and MCS scheme for the UEs connected to the base station this may improve the grant-free transmissions made to the base station by reducing collisions. Using a lower transmission bandwidth may result in lower collision probabilities.

At step 309, the UE will perform grant-free transmissions using the different sub-band and MCS signalled to the UE at step 307. Thus at step 309 the UE will transmit data to the base station.

Even though not shown in FIG. 3 the base station may signal further to the UE(s) to use a different sub-band and associated MCS again. The UE(s) can change to a different sub-band and associated MCS multiple times.

Some embodiments may alternatively or additionally be used for Hybrid automatic repeat request (HARQ) retransmissions.

HARQ retransmission can also be sent by the UE on the resources assigned for grant-free transmission. For example, upon reception of a negative acknowledgment (NACK), the UE can send the grant-free UL HARQ retransmission on the same sub-band and associated MCS as the original transmission. Alternatively or additionally, the UE may be configured to autonomously select a different sub-band and associated MCS for each HARQ retransmission (e.g. the UE using a fall-back to use all N-PRBs having a higher bandwidth with a more robust MCS for the HARQ retransmissions). The exact time of the grant-free HARQ retransmission, after having received the NACK in the downlink (or no acknowledgement (ACK) at the expected time), may be subject to a random back-off time so to randomize transmission which may lower the probability of harmful collisions.

For the cases where HARQ retransmission is sent by UE on a grant based resource, the receiving signal quality from UL grant-free transmission can be used to determine the proper MCS level for a HARQ retransmission as well. For example, a first uplink grant-free transmission may use MCS2. If the detection of the transmission fails then the base station can allocate resources for retransmission according to MCS1 or MCS0 in an effect to have a better chance of a successful reception.

Figure 4:
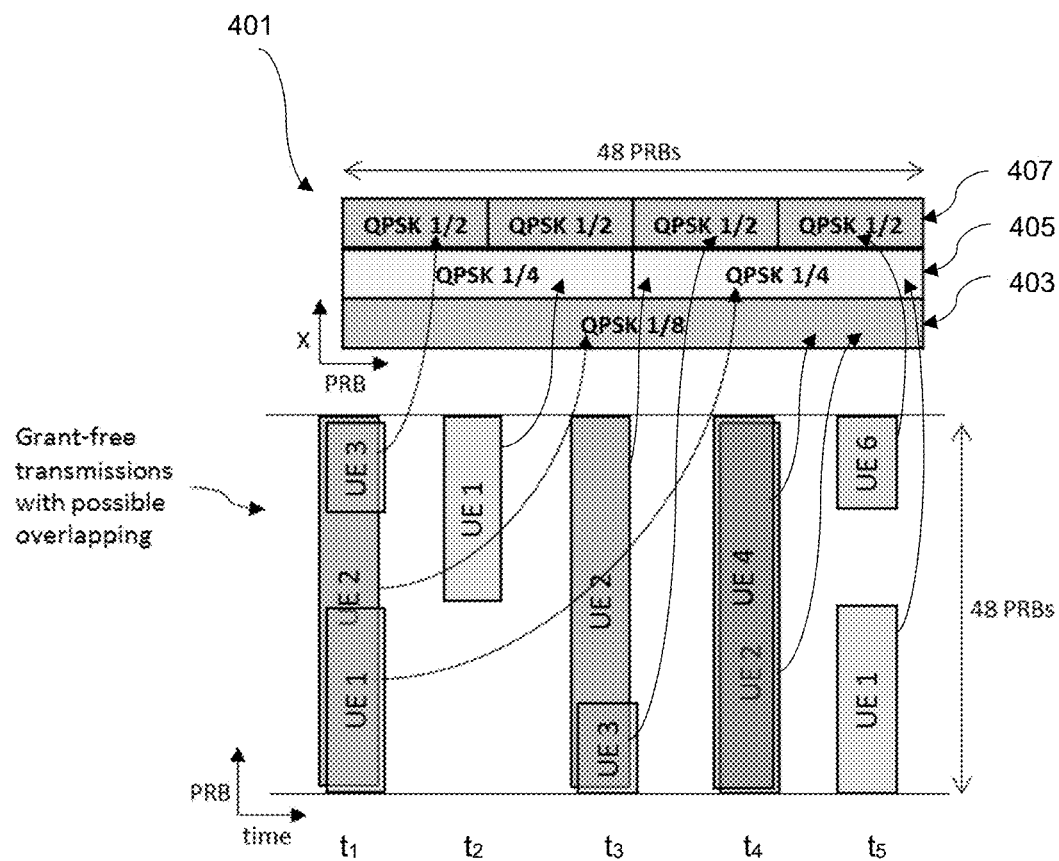
FIG. 4 shows schematically an example modulation and coding scheme for grant-free transmissions.

FIG. 4 illustrates the operation of the UE according one embodiment in accord with the signalling of FIG. 3. In the example case shown in FIG. 4 a configured resource grid 401 has a maximum transmission bandwidth of 48 PRBs (i.e. N=48). The maximum transmission bandwidth is divided into 3 sub-bands levels corresponding to three different MCSs (i.e. x=0, 1, 2). The resource grid 401 comprises a level-0 sub-band 403 which corresponds to the full bandwidth transmission, 48 PRBs, with an associated MCS of quadrature phase-shift keying (QPSK) ⅛ (coding rate), a level-1 sub-band 405 which has half the bandwidth, 24 PRBs, with an associated MCS of QPSK ¼ and a level-2 sub-band 407 which has a quarter of the maximum bandwidth, 12 PRBs, with an associated MCS of QPSK ½.

As can be seen from the lower portion of FIG. 4, at time $t_1$ three different UEs (UE1, UE2, UE3) are transmitting data simultaneously. UE1 is transmitting according to the level 1 configuration 405, with 24 PRBs and QPSK ¼. UE2 is transmitting according to the level-0 configuration 403, with 48 PRBs and QPSK ⅛. UE3 is transmitting according to the level-2 configuration 407, with 12 PRBs and QPSK ½. Therefore, grant-free transmissions from the UEs to the base station are possible with overlapping of the frequency resources. Advanced receivers with interference suppression capabilities may be utilized in the base station. This permits the base station to decode signals from overlapped transmissions in spite of the possible mutual interference that may occur.

Only a single UE is transmitting at an instant in time as shown at time $t_2$. At time $t_2$ only UE2 is transmitting to the base station using the level-1 configuration 405.

At time $t_3$ UE2 is transmitting to the base station using the level-1 configuration 405. UE3 is transmitting according to the level-2 configuration 407.

Two separate UEs can simultaneously have UL grant-free transmission to the base station using the same sub-band configuration as shown at time $t_4$. At time $t_4$ both UE2 and UE4 are transmitting using the level-0 configuration 403.

At time $t_5$ UE1 is transmitting according to the level 1 configuration 405 while UE6 is transmitting according to the level-2 configuration 407.

At each transmission instant, as shown along the x-axis of the lower drawing, the UEs are configured to transmit a payload, for example, 32 bytes, in the selected sub-band and with the associated MCS.

In another example, the UE selects a sub-band from the configured resource grid. This gives more autonomy to the UE, which can be beneficial in cases where the UE has capabilities, for instance, to sense the channel quality and take faster decision.

In another embodiment, multiple sub-bands of the resource grid can be configured using the same PRBs and MCS, but with different power control or transmission mode configurations. In general, each link adaptation component (MCS, Power Control, Transmission Mode, etc.) may be a setting for the grid configuration. However, having fewer options in the resource grid in pre-configuration will reduce the search space which may be beneficial for the speed and efficiency of the base station for cases where a UE autonomously selects which sub-band it will use to perform transmissions.

Figure 5:
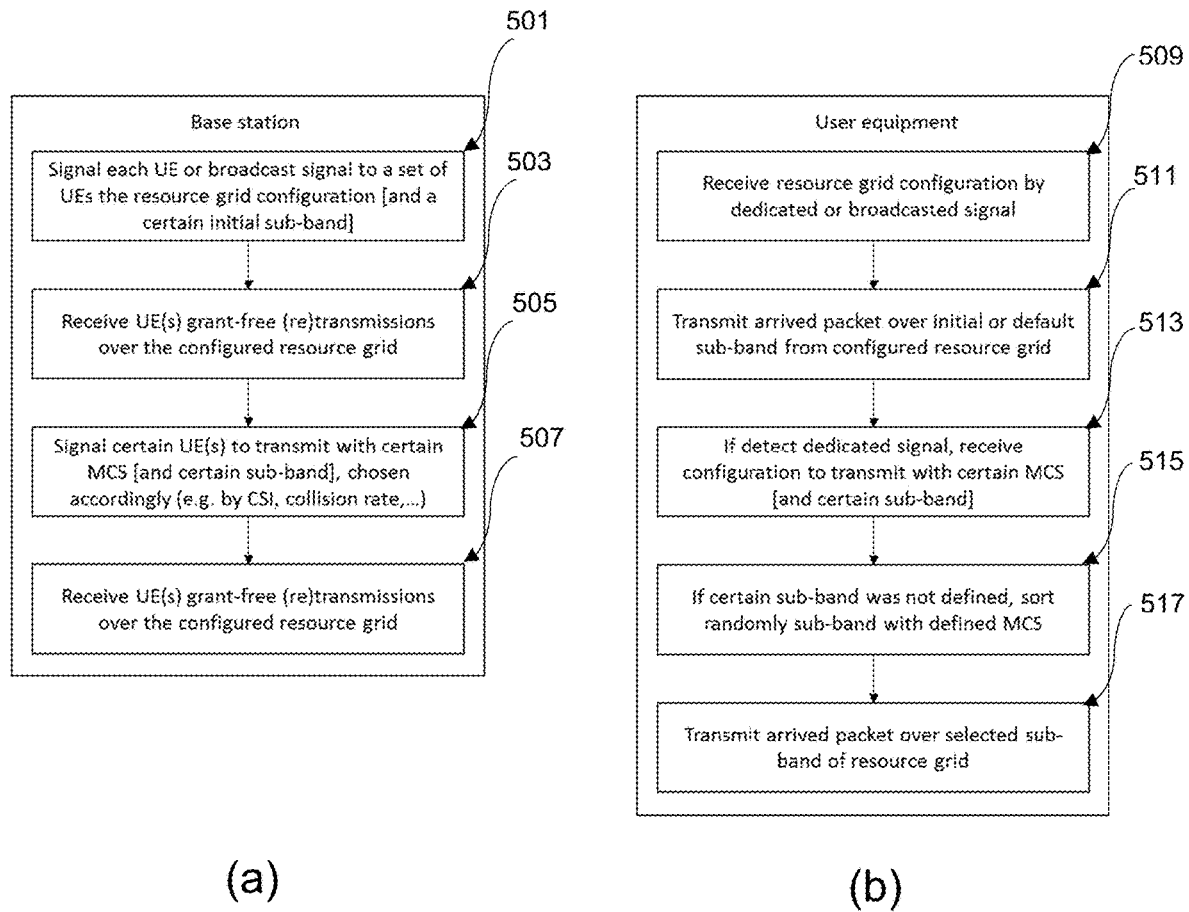
FIG. 5a shows a method performed by an apparatus in a base station.
FIG. 5b shows a method steps performed by a base station and user equipment respectively.

FIG. 5a show an example of the method steps performed in a base station.

At step 501, an apparatus (for example as shown in FIG. 8) causes the base station to signal to a UE, or to broadcast to multiple UEs connected the base station, a resource grid configuration. This resource grid configuration may be as previously discussed and may for example be as shown in any of FIGS. 1, 2 and 4. At step 501 the base station may optionally signal a default sub-band and MCS configuration for the UE to initially use for grant-free transmissions.

At step 503, the base station receives the grant-free transmission or retransmission from the UE or UEs using the default configured signalled to the UE(s) at step 501. As an example, the UE may have transmitted using the maximum transmission bandwidth (e.g. 48 PRBs) as the default. The apparatus may determine that one or more UEs are to use a different MCS, as previously discussed. The decision change the MCS could be based on channel state information (CSI), collision rate, etc. that has been measured by the base station. In other examples, the UEs feedback information to the base station to indicate that a different sub-band and MCS may be more appropriate.

At step 505, the apparatus causes the base station to signal to one or more certain UEs to perform future grant-free transmissions with a different sub-band and associated MCS.

The signal to the UEs at step 505 may comprise information regarding which one of a plurality of the sub-bands the UEs should use for future grant-free transmissions. In some examples, one of a plurality of sub-bands could mean the UE using two or more sub-bands simultaneously. Alternatively or additionally, the information may include the value of x (i.e. amount of sub-bands). Then the UEs can randomly select, with equal probability, which of the x+1 sub-bandwidth options are used for each new grant-free transmission.

At step 507, the base station receives a grant-free transmission or retransmission from the UE(s) wherein the UE(s) are using the different sub-band and MCS signalled to the UE at step 505.

FIG. 5b show an example of the method steps performed in in a UE according to some embodiments.

At step 509, the UE receives a signal from a base station comprising configuration information which is provided to an apparatus. The configuration information comprises a resource grid which includes multiple sub-band levels with associated MCS(s). The UE may receive the signal via a dedicated signal such as, for example, dedicated RRC signalling or via a broadcast/multicast signal.

At step 511, the apparatus causes the UE to transmit packets to the base station using grant-free uplink transmission. The apparatus causes the UE to transmit using an initial or default sub-band level and associated MCS which may have been signalled to the UE at step 509.

At step 513, the UE may detect a dedicated signal from the base station. The dedicated signal may include information to utilize a different sub-band level and associated MCS for future grant-free uplink transmissions. The information signalled may comprise information regarding which of the specific sub-bands should be used for future grant-free transmissions. This information is provided to the apparatus In some examples, the signalled information may not include a specific sub-band and MCS, as shown at step 515. If the signalled information does not include a specific sub-band and MCS then the information may comprise a value of x (i.e. the sub-band level). Then the apparatus of the UE can randomly select, with equal probability, which of the x+1 sub-bandwidth options should be used for each new grant-free transmission.

At step 517, the apparatus causes the UE to transmit, grant-free, any UL packets to the base station over the selected sub-band while using the selected MCS.

Some embodiments may be used for URLLC services which may be are characterized by small/medium packet transmissions. The payload size for the URLLC service can be known or pre-defined during an initial configuration. In the case that the payload does not fit into the PRBs for the selected sub-band, there are numerous solutions to overcome this problem that could be implemented which include, for example, segmentation (if larger) and zero padding (if shorter).

If a preamble or DMRS is used, possibly for UE identification during the grant-free transmission, then the preamble or DMRS part can be confined over the selected sub-band size as the data part. In other examples, the packet can be transmitted over a configured larger sub-band in order to fit a required sequence length.

In general, the various examples shown may be implemented in hardware or in special purpose circuits, software, logic or any combination thereof. Some aspects may be implemented in hardware, while other aspects may be implemented in firmware or software which may be executed by a controller, microprocessor or other computing device, although the invention is not limited thereto. While various aspects may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out methods are described in the present disclosure. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Examples of the disclosed embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method performed by a processor, the method comprising:
   receiving, by the processor, information providing an initial configuration for a first subset of a set of physical resource blocks and a second subset of the set of physical resource blocks, the set of physical resource blocks being divided into a plurality of levels, a number of subsets in a level of the plurality of levels depending on a resource grid configuration of the set of physical resource blocks, the first subset being associated with a first level in the plurality of levels and having a first transmission scheme and the second subset being associated with a second level in the plurality of levels and having a second transmission scheme, the first transmission scheme having at least one of a different modulation and coding scheme or a different transmit power control setting than the second transmission scheme;
   causing, by the processor, a first grant free uplink data transmission from a device to a single base station via the first subset;
   receiving, by the processor from an access point, a signal to transmit a second grant free uplink transmission using the second subset; and
   based on the signal to transmit the second grant free uplink transmission using the second subset, causing, by the processor, the second grant free uplink data transmission from the device to the single base station using the second subset.

2. The method according to claim 1, further comprising:
   causing, by the processor, information about transmitting the second grant free uplink transmission using the second subset to be provided to the single base station.

3. The method according to claim 1, wherein the first subset is associated with a different number of physical resource blocks than the second subset.

4. The method according to claim 1, wherein said set of physical resource blocks comprises a positive integer of physical resource blocks divided by a number of the plurality of levels.

5. The method according to claim 4, wherein a first number of subsets in a level of the plurality of levels is two to a power of a second number associated with the level.

6. The method according to claim 5, wherein:
   the positive integer is a first positive integer; and
   a third number of physical resource blocks of the first subset or the second subset is a second positive integer divided by the first number of subsets in the level.

7. The method according to claim 4, wherein the transmission scheme of the first subset or the second subset is dependent on a level within the plurality of levels.

8. The method according to claim 1, wherein the first subset is a default subset, said default subset being initially used in the first grant free uplink transmission.

9. The method according to claim 1, wherein the first subset has a larger bandwidth than the second subset.

10. The method according to claim 1, wherein said second grant free uplink transmission comprises a hybrid automatic repeat request retransmission.

11. The method of claim 1, wherein:
all subsets of the set of physical resource blocks that are associated with the first level in the plurality of levels have the first transmission scheme; and
all subsets of the set of physical resource blocks that are associated with the second level in the plurality of levels have the second transmission scheme.

12. A method comprising:
sending, by an access point, information to a device, said information providing an initial configuration for a first subset of a set of physical resource blocks and a second subset of the set of physical resource blocks, the set of physical resource blocks being divided into a plurality of levels, a number of subsets in a level of the plurality of levels depending on a resource grid configuration of the set of physical resource blocks, the first subset being associated with a first level in the plurality of levels and having a first transmission scheme and the second subset being associated with a second level in the plurality of levels and having a second transmission scheme, the first transmission scheme having at least one of a different modulation and coding scheme or a different transmit power control setting than the second transmission scheme;
causing, by the access point, the device to send a first grant free data transmission from the device to a single base station via the first subset;
determining, by the access point, for the device to transmit a second grant free uplink transmission using the second subset; and
causing, by the access point, the device to transmit the second grant free uplink data transmission to the single base station using the second subset.

13. The method according to claim 12, comprising:
receiving, by the access point, information from the device indicating that said device proposes to transmit via said first subset for the first grant free uplink transmission.

14. The method according to claim 13, wherein determining for the device to transmit via said second subset for the second grant free uplink transmission is based on the information received by the access point from the device.

15. The method of claim 12, wherein:
all subsets of the set of physical resource blocks that are associated with the first level in the plurality of levels have the first transmission scheme; and
all subsets of the set of physical resource blocks that are associated with the second level in the plurality of levels have the second transmission scheme.

16. A method comprising:
causing, by an access point, information to be provided to a device, said information providing an initial configuration for a first subset of a set of physical resource blocks for a first grant free uplink data transmission to a single base station and a second subset of the set of physical resource blocks for a second grant free uplink data transmission to the single base station, the set of physical resource blocks being divided into a plurality of levels, a number of subsets in a level of the plurality of levels depending on a resource grid configuration of the set of physical resource blocks, the first subset being associated with a first level in the plurality of levels and having a first transmission scheme and the second subset being associated with a second level in the plurality of levels and having a second transmission scheme, the first transmission scheme having at least one of a different modulation and coding scheme or a different transmit power control setting than the second transmission scheme;
causing, by the access point, information to be provided to the device, the information configuring the device to transmit the first subset for the first grant free uplink data transmission to the single base station; and
causing, by the access point, the device to transmit the second grant free uplink data transmission to the single base station using the second subset.

17. The method according to claim 16, further comprising causing, by the access point, further information to be provided to said device, said further information indicating that said device will transmit via said second subset for the second grant free uplink transmission.

18. The method of claim 16, wherein:
all subsets of the set of physical resource blocks that are associated with the first level in the plurality of levels have the first transmission scheme; and
all subsets of the set of physical resource blocks that are associated with the second level in the plurality of levels have the second transmission scheme.

19. An apparatus, comprising at least one processor and at least one memory including computer program code, the at least one memory and the computer program code configured, with the at least one processor, to cause the apparatus at least to:
receive, by the apparatus, information providing an initial configuration for a first subset of a set of physical resource blocks and a second subset of the set of physical resource blocks, the set of physical resource blocks being divided into a plurality of levels, a number of subsets in a level of the plurality of levels depending on a resource grid configuration of the set of physical resource blocks, the first subset being associated with a first level in the plurality of levels and having a first transmission scheme and the second subset being associated with a second level in the plurality of levels and having a second transmission scheme, the first transmission scheme having at least one of a different modulation and coding scheme or a different transmit power control setting than the second transmission scheme;
cause, by the apparatus, a first grant free uplink data transmission from a device to a single base station via the first subset;
receive, by the apparatus from an access point, a signal to transmit a second grant free uplink transmission using the second subset; and
based on the signal to transmit the second grant free uplink transmission using the second subset, cause, by the processor, the second grant free uplink data transmission from the device to the single base station using the second subset.

20. The apparatus of claim 19, wherein:
all subsets of the set of physical resource blocks that are associated with the first level in the plurality of levels have the first transmission scheme; and
all subsets of the set of physical resource blocks that are associated with the second level in the plurality of levels have the second transmission scheme.

21. An apparatus-readable non-transitory data storage medium comprising computer executable code which when run on at least one processor is configured to cause an apparatus to perform:

receiving, by the apparatus, information providing an initial configuration for a first subset of a set of physical resource blocks and a second subset of the set of physical resource blocks, the set of physical resource blocks being divided into a plurality of levels, a number of subsets in a level of the plurality of levels depending on a resource grid configuration of the set of physical resource blocks, the first subset being associated with a first level in the plurality of levels and having a first transmission scheme and a second subset being associated with a second level in the plurality of levels and having a second transmission scheme, the first transmission scheme having at least one of a different modulation and coding scheme or a different transmit power control setting than the second transmission scheme;

causing, by the apparatus, a first grant free uplink data transmission from a device to a single base station via the first subset;

receiving, by the apparatus from an access point, a signal to transmit a second grant free uplink transmission using the second subset; and based on the signal to transmit the second grant free uplink transmission using the second subset, causing, by the apparatus, the second grant free uplink data transmission from the device to the single base station using the second subset.

22. The apparatus-readable non-transitory data storage medium of claim 21, wherein:

all subsets of the set of physical resource blocks that are associated with the first level in the plurality of levels have the first transmission scheme; and all subsets of the set of physical resource blocks that are associated with the second level in the plurality of levels have the second transmission scheme.

* * * * *